United States Patent [19] [11] 4,156,661
Brodmann et al. [45] May 29, 1979

[54] METHOD OF MODIFYING ELECTRICAL PROPERTIES OF RARE-EARTH CHROMITE MATERIAL

[75] Inventors: Franz J. Brodmann, Philadelphia; Ronald Staut, Bala Cynwyd, both of Pa.

[73] Assignee: General Refractories Company, Bala Cynwyd, Pa.

[21] Appl. No.: 886,063

[22] Filed: Mar. 13, 1978

[51] Int. Cl.$^2$ ............................................. H01B 1/08
[52] U.S. Cl. ...................................... 252/521; 423/21; 423/263; 106/73.2
[58] Field of Search ..................... 252/521; 106/73.2; 310/11; 423/21, 596, 263

[56] References Cited

U.S. PATENT DOCUMENTS

| 3,610,888 | 10/1971 | Button | 252/521 |
|---|---|---|---|
| 3,630,968 | 12/1971 | Hamano et al. | 252/521 |
| 3,974,108 | 8/1976 | Staut et al. | 252/521 |
| 4,045,375 | 8/1977 | Komatu | 252/521 X |

FOREIGN PATENT DOCUMENTS 4186072  11/1973  Australia ................................ 252/521

*Primary Examiner*—Benjamin R. Padgett
*Assistant Examiner*—E. Suzanne Parr
*Attorney, Agent, or Firm*—Everett H. Murray, Jr.; Brian G. Brunsvold; David W. Hill

[57] ABSTRACT

A method of decreasing the electrical resistivity of a rare-earth chromite material by substituting bivalent metal ions for some of the chromium or rare-earth ions therein. The method includes applying a solution containing the bivalent metal ions to the rare-earth chromite under vacuum conditions, drying the solution on the chromite, and diffusing the bivalent metal ion into the rare-earth chromite by firing the chromite in a controlled atmosphere.

9 Claims, No Drawings

METHOD OF MODIFYING ELECTRICAL PROPERTIES OF RARE-EARTH CHROMITE MATERIAL

BACKGROUND OF INVENTION

The present invention is related to rare-earth chromites that are used as electrical components.

Conventional rare-earth chromites are useful in a number of electrical applications because their electronic structure makes such chromites electrically conductive. In addition, the refractory nature of the materials at high temperatures makes them useful for service at high temperatures under relatively severe conditions.

Typical applications for conventional rare-earth chromites are resistance heating electrodes or electrodes for the magnetohydrodynamic (MHD) generation of electricity. In such applications, it may be preferable to alter the conductivity of the chromite and several prior art methods have been developed.

The method of primary interest herein is that of substituting other metallic ions for those normally within the chromite structure. Generally, such substitution is termed "doping." The effect of the doping depends on the metal ion substituted by introduction into the crystalline structure, the ion that is eliminated from the crystalline structure by the substitution and the amount of metallic ions being substituted.

Rare-earth chromites have the Perovskite structure, normally designated by the formula $ABO_3$. A and B in this formula for Perovskite relate to its crystalline structure. Perovksite has an orthorhombic crystalline structure with the metal ions arranged in the structure either at the corner positions in the crystal lattice (the A-sites) or the body-centered positions (the B-sites). The oxygen ions are at the face-centered sites of the orthorhombic crystalline structure. In the case of the present invention, the Perovskite is a chromite, so B in the formula is chromium. The rare-earth chromite of this type is also conventionally designated as $RCrO_3$, where R is the rare-earth element.

The electrical conductivity of rare-earth chromites results from the interaction of the unfilled d orbitals of the chromium ions. If d orbitals overlap, a conduction band is formed. A wide conduction band produces an electrically conductive material. The modification of the electronic structure of the chromite is the primary object of doping procedures.

The doping of rare-earth chromites with bivalent metal ions appears to cause a charge imbalance in the Perovskite lattice, thus forcing a valence change in the chromite from three to four to maintain electrical neutrality. As a result, an electron is transferred into the conductivity band. Using this procedure, the controlled valency technique leads to the formation of a P-type semiconductor.

It is known in the art to modify the electronic properties of the rare-earth chromites by doping them with metallic ions that substitute at the A- and B-sites of the Perovskite lattice. The introduction of calcium ions to rare-earth chromites is disclosed in U.S. Pat. No. 3,630,968 to Hamano et al., and the introduction of magnesium or strontium ions is disclosed in U.S. Pat. No. 3,974,108 to Staut et al. The substitution of these ions, as shown in the prior art, has the desired effect on the electrical properties of the rare-earth chromites.

Typically, rare-earth chromites such as lanthanum chromite are prepared by dissolving lanthanum oxide in an aqueous chromium trioxide solution, drying the solution, and calcining the resultant product in an oxidizing atmosphere.

In the prior art, the doping of rare-earth chromites was carried out by introducing the bivalent metal ion component stoichiometrically as a solid into the initial aqueous solution as a substitution for some of the rare-earth oxide.

This method requires the preparation of numerous gradations of rare-earth chromite powder having differing electrical resistivity characteristics, which may then be formed into shaped electrical elements by ceramic forming techniques for specifically desired applications.

Each group of similar elements must be produced separately from separate batches of modified rare-earth chromite powders prepared specifically for the electrical resistivity characteristics desired.

As used herein, the word "elements" refers to electrically conductive ceramically formed bodies of various shapes which may be used as semiconductors, resistors, electrodes or the like.

Also, in certain specific electrical applications, such as the production of thermoelectric elements, it has been found that elements having uniform resistivity are subject to rapid deterioration at certain points when exposed to electric currents. More specifically, such elements are generally provided with electrical contact points for connecting the element to an electric current. The electrical contact points of such an element often overheat if the element has an overall high resistance. Particularly in environments requiring a thermoelectric element capable of attaining very high heat values, problems arise in preventing the destruction or rapid deterioration of the electrical contact points of the element from the excessive heat.

This problem has been reduced in significance by the use of elements having differing resistivity at different portions of the element, such as high resistance at a heating element portion and low resistance at electrical contact points.

Elements having differing resistivity at different portions of the element may be formed using a layering technique with graded powders as above, described in U.S. Pat. No. 3,531,421 to Foex et al. However, such a method becomes less economical as the required number of different rare-earth chromite powders and the number of specifically designed elements increases.

It is therefore a primary object of the invention to provide an improved method for reducing the electrical resistivity of a rare-earth chromite material.

Another object of the invention is to provide an improved method for forming a rare-earth chromite element having varying electrical resistivity at different portions of the element.

Additional advantages of the invention will be set forth in part in the description which follows and in part will be obvious from the description, or may be learned by practice of the invention. The advantages of the present invention may be realized and attained by means of the combinations particularly set out in the appended claims.

SUMMARY OF THE INVENTION

In accordance with the purposes of the invention, as embodied and broadly described herein, the rare-earth chromite formed by the method of the present invention has bivalent metal ions substituted for some of the chromium or rare-earth ions therein. The bivalent metal ions are substituted for the chromium or rare-earth ions in amounts sufficient to significantly affect the electrical resistivity of the chromite.

Preferably, the rare-earth metal is lanthanum and the metal ion substituted for the chromium is magnesium.

The invention comprises a method of forming a rare-earth chromite element having a portion of decreased electrical resistivity from a presintered element. The electrical resistivity of the rare-earth chromite is reduced by effecting a partial substitution of bivalent metal ions for chromium or rare-earth ions in the chromite.

The method of forming such a rare-earth chromite with reduced electrical resistivity includes the step of applying a vacuum to the presintered rare-earth chromite. The chromite is then contacted with a solution containing a bivalent metal ion that will substitute for a chromium or rare-earth ion in the rare-earth chromite. The solution is then dried on the rare-earth chromite and then the bivalent metal ion is diffused into the rare-earth chromite by firing the chromite in a controlled atmosphere.

As stated above, it is preferred that the rare-earth element be lanthanum and the bivalent metal ion be magnesium. However, other rare-earth elements, and other bivalent metal ions such as calcium, strontium or barium may be used.

It is also preferred that the solution be applied only to the portions of the rare-earth chromite material for which decreased resistivity is desired. In this manner, rare-earth chromite elements may be formed with differing resistivities at different portions of the element.

It is also preferred that the solution be applied to a rare-earth chromite element sequentially over partially overlapping areas on the rare-earth chromite element. This provides a sequential variation in the amount of solution applied to the element which, in turn, results in a sequential variation of the electrical resistivity of the article when the element is dried and the bivalent metal ion is diffused into the chromite element.

DESCRIPTION OF THE PREFERRED EMBODIMENTS

To best achieve the desired results of increased electrical conductivity of a rare-earth chromite material, the modified rare-earth chromite of the present invention is prepared by substituting bivalent metal ions for chromium or rare-earth ions in the A- or B-site of the Perovskite lattice of the chromite. This substitution is accomplished by adding a doping agent such as a methanol solution of magnesium acetate to the prefired rare-earth chromite compound.

More specifically, a typical rare-earth chromite such as lanthanum chromite may be prepared by dissolving lanthanum oxide in an aqueous chromium trioxide solution, drying the solution, and calcining the resultant product in an oxidizing atmosphere. Shaped elements formed from unmodified rare-earth chromite powder by ceramic-forming techniques are impregnated under vacuum with a doping agent containing bivalent metal ions such as methanol solution of magnesium acetate. After being dried and fired in a controlled atmosphere, these elements exhibit a substantial reduction in resistivity over the undoped ceramic elements made of the rare-earth chromite.

While an oxidizing atmosphere is generally preferred for the firing step, the invention is operable in some embodiments with a neutral or slightly reducing atmosphere depending on the composition of the chromite or the elements being impregnated.

In other embodiments, dilution or doping agents, such as alumina or silica may be added in either solution or powdered form to the unmodified or modified rare-earth chromite to alter the resistance of the resulting material. Modification of portions of articles made from these mixtures can be accomplished in accordance with the method of the present invention to produce rare-earth chromites having specifically desired conductivity properties.

Semiconductive elements comprised of rare-earth chromites which have been modified in accordance with this invention are useful for a wide range of electrical applications, and represent a significant advance in the art. Specifically, such elements may be prepared with varying conductivity properties at different points on the same element. This may be accomplished in accordance with the present invention by selectively impregnating different portions of unmodified rare-earth chromite semiconductive elements with a solution containing bivalent metal ions such as the alcohol solution of magnesium acetate discussed above. After being dried and fired in a controlled atmosphere, in accordance with the methods of the present invention, the resulting semiconductive elements display a substantially decreased resistivity at the doped portions as compared to the unmodified rare-earth chromite areas.

The advantages provided by semiconductive elements having portions with varying levels of conductivity are numerous and such elements are particularly useful for electrodes in magnetohydrodynamic or thermoelectric energy converters, or other electrode heating elements.

In particular, rare-earth chromite semiconductive elements may be constructed having doped electrical contact points with low electrical resistivity, and having the remainder of the element of a higher resistance. By successively doping portions of a semiconductive element with varying strength solutions of bivalent metal ions, in accordance with the method of the present invention, an element can be obtained in which the electrical resistivity varies gradually from a minimum to a maximum value of the unmodified chromite.

Semiconductive elements having an electrical interface near an extremity of the element may be formed in accordance with the methods of the invention, such that the resistivity of the element gradually decreases near the interface.

The interface portion is normally an electrical contact point, the area surrounding the contact point having a low resistivity to avoid the destructive effects of excessive heat caused by the flow of electric current through the element. If the interface area of the element is selectively doped with decreasing strength solutions of bivalent metal ions in accordance with the methods described below, a gradual variation in resistivity may be obtained from a minimum valve directly adjacent to the electrical contact point to a maximum value at the point where the modified chromite abuts the unmodified portion of the element.

The method of the present invention is more economical than prior art methods particularly when large quantities of rare-earth chromite electrical elements with varying electrical properties are required. Such elements may be mass produced in unmodified form, and stored until further processing is desired. Further modification of a desired quantity of elements in accordance with the method of this invention can be accomplished rapidly without the need for further preparation of powders or compressing of shapes.

The method of this invention is generally carried out by exposing a rare-earth chromite material to an environment in which bivalent metal ions are available and can substitute for a portion of the chromium or rare-earth ions in the chromite to reduce the electrical resistivity of the substituted portion. The preferred method is accomplished by applying a doping solution containing bivalent metal ions to rare-earth chromite under vacuum conditions. The solution is then allowed to dry, and the chromite is fired in a controlled atmosphere. Excellent results in decreased resistivity of the doped portions were obtained when the firing temperature was greater than 1500° C., and when the firing was continued for approximately 3 hours, but these parameters are not known to be critical, and variations in time and temperature of firing may be made to obtain varying degrees of resistivity in the modified portions of rare-earth chromite.

Extruded ceramic elements of lanthanum chromite impregnated with a methanol solution of magnesium acetate in accordance with the above method, for example, displayed a 50% lower resistivity at the doped portions than for the unmodified lanthanum chromite portions.

Alternatively, portions of a rare-earth chromite electrical element formed by ceramic forming techniques may be first impregnated under vacuum with an oil which is insoluble in the bivalent ion solution to maintain these areas free from the doping agent. The element may then be impregnated with the doping agent according to the method discussed above. The presence of the oil prevents the portion so treated from being exposed to the bivalent ions in the doping agent, and thereby insures that the oil-treated areas will remain substantially unmodified. The oil-treated portions of elements prepared in this manner heat up when the elements are connected to electrical voltage, while the doped portions stay relatively cool.

The above method may be repeated several times with the element being successively treated with slightly overlapping impregnations of the doping agent to obtain a resistivity gradient over the entire element or portions of the element such as the electrical contact point areas. This may be accomplished by dipping the element into the doping solution at successively decreasing depths for each treatment.

The time, temperature, and oxygen partial pressure of the firing step may also be varied to obtain different resistance characteristics with particular doping agents.

The present invention will be more clearly understood with references to the following examples which illustrate the best modes of practicing the invention but which should not be construed as limiting upon the scope of the invention.

EXAMPLE 1

162.91 gr of lanthanum oxide was dissolved in a one mole per liter aqueous chromium trioxide solution (100 gr $CrO_3$/1L). The solution was then dried at 150° F. and then calcined in an oxidizing atmosphere at 1500° C. for three hours. After drying, the material was mixed with 6% (methyl cellulose) binder and 25% water and then packed into a piston extruder. Using a 1/10" diameter die, rods of various lengths were extruded and bent into horseshoe-shaped elements. After drying overnight, the elements were fired at 1000° C. for one hour to burn out the binder and to form an initial ceramic bond. Either both ends or only one end of the horseshoe-shaped elements were impregnated under vacuum with a 1 mol magnesium acetate/500 ml methanol solution. After drying, the elements were fired at 1575° C. in an oxidizing atmosphere for three hours. The resistivity of the doped material was about 50% lower than for the $LaCrO_3$ material.

EXAMPLE 2

The $LaCrO_3$ material synthesized and formed as described in Example 1 was first impregnated under vacuum with an oil which is insoluble in the alcohol solution of magnesium acetate. The impregnation was localized at the central bend point of the horseshoe-shaped elements to maintain this area free from the doping agent. Both ends of the elements were then impregnated with the alcoholic magnesium acetate solution as in Example 1. After drying and firing at 1515° C. in oxidizing atmosphere for three hours, the elements were connected to 110 volts (line voltage). The tip of the elements at the central bend point composed of the undoped material heated up, whereas the electrical contact points at the ends stayed relatively cool. The selective dipping method was also used for doping elements of other than the horseshoe shape.

EXAMPLE 3

$LaCrO_3$ material synthesized as described in Example 1, was pressed into intricate shapes using a hydraulic press. The filling powder was especially prepared to include 25% PVA (polyvinylacetate) 7:1 binder, 25% carbowax (polyethyleneglycol) as lubricant, and 0.5% stearic acid as anti-sticking agent. The ingredients were mixed with the $LaCrO_3$ material in a wet slurry, then ball-milled and dried. The powder was finally screened through a 50-mesh screen to break up most agglomerations. This free flowing powder was filled into a steel mold and pressed at 10,000 lbs. to form horseshoe-shaped elements. The formed elements were fired up to 1000° C. to burn out the organic components and to open up the porosity for the following impregnation procedure as described in Examples 1 and 2. After drying, the impregnated elements were fired at 1650° C. in a gas-fired furnace. Connected to 110 volts (line voltage) the non-impregnated tip area at the central bend point of the resistor heated up, whereas the electrical contact points at the ends stayed cool.

What is claimed is:

1. A method of forming a rare-earth chromite element having a portion thereof of decreased electrical resistivity from pre-sintered element, comprising the steps of:
   applying a vacuum to said rare-earth chromite element;
   contacting the rare-earth chromite element with a solution containing a bivalent metal ion selected from the group consisting of magnesium, calcium, strontium, and barium;
   drying said solution on said chromite element; and
   diffusing said bivalent metal ion into said rare-earth chromite element by firing said chromite in a controlled atmosphere.

2. The method of claim 1 wherein said rare-earth is lanthanum.

3. The method of claim 2 wherein said firing is conducted in an oxidizing atmosphere.

4. The method of claim 3 wherein said firing step is at a temperature in excess of 1500° C.

5. The method of claim 4 wherein said firing step is approximately 3 hours in length.

6. The method of claim 1 wherein said chromite is repeatedly contacted with said solution to increase the total amount of bivalent metal ions applied to said chromite.

7. The method of claim 6 wherein said solution is applied sequentially to partially overlapping areas on said element to provide a sequential variation in the amount of solution applied to said element resulting in a sequential variation of the electrical resistivity of said element after said element is dried and said bivalent metal ion is diffused into said chromite element.

8. The method of claim 7 wherein said sequential variation results in the electrical resistivity of said element varying from a maximum to a minimum value over the total length of said areas.

9. The method of claim 1 also including the step of impregnating at least a portion of the rare-earth chromite element with an oil insoluble in the bivalent metal ion solution before the step of contacting the rare-earth chromite element with a solution containing a bivalent metal ion.

* * * * *